Nov. 30, 1954  F. G. L. BECKER  2,695,756
APPARATUS FOR DISINTEGRATING BALES OF FIBROUS MATERIALS
Filed Oct. 24, 1949  4 Sheets-Sheet 4

Inventor
Frederick George Lucas Becker

United States Patent Office 2,695,756
Patented Nov. 30, 1954

2,695,756

APPARATUS FOR DISINTEGRATING BALES OF FIBROUS MATERIALS

Frederick George Lucas Becker, West Humble, near Dorking, England, assignor to Cellulose Development Corporation Limited, Hatch End, England, a British company Application October 24, 1949, Serial No. 123,118

Claims priority, application Great Britain December 15, 1948

2 Claims. (Cl. 241—163)

This invention relates to apparatus for disintegrating bales of vegetable fibrous materials such as stems of plants and particularly bagasse so as to render it suitable for subsequent conversion into cellulose.

According to this invention an apparatus for disintegrating bales of fibrous materials comprises an outer casing in which is rotatably mounted a rotor, a hopper at one end of the casing arranged to hold a bale against rotation while in contact with one end of the rotor which end is provided with short teeth adapted to rip off parts of the bale and feed them axially towards the other parts of the casing and rotor, which other parts are provided with inwardly and outwardly extending teeth respectively which subject the ripped-off portions to a rubbing action and an outlet at the end of the casing remote from the hopper.

Preferably the inwardly and outwardly extending teeth are so disposed that the gaps between the teeth on the rotor when passing the fixed teeth on the casing are smaller at the end of the apparatus remote from the hopper and thus the fibres are subjected to more intensive rubbing as they travel towards the outlet, whereby the pith is loosened from the fibres. The teeth on the rotor opposite the hopper may be spaced apart circumferentially by an amount comparable with the width of the bale.

Preferably also the casing and rotor are tapered along the length and at least the rotor may be polygonal in contour and the hopper is arranged at the smaller diameter end of the apparatus.

This arrangement also has the effect of increasing the rubbing action on the fibres and their disintegration as they pass towards the outlet owing to the increasing linear velocity of the teeth. The inwardly-extending teeth on the casing may be disposed on the upper half only, thus leaving a clear space under the rotor facilitating the clearing of the machine should blockage occur.

The teeth may be detachably secured so that they may be renewed.

Figure 1:
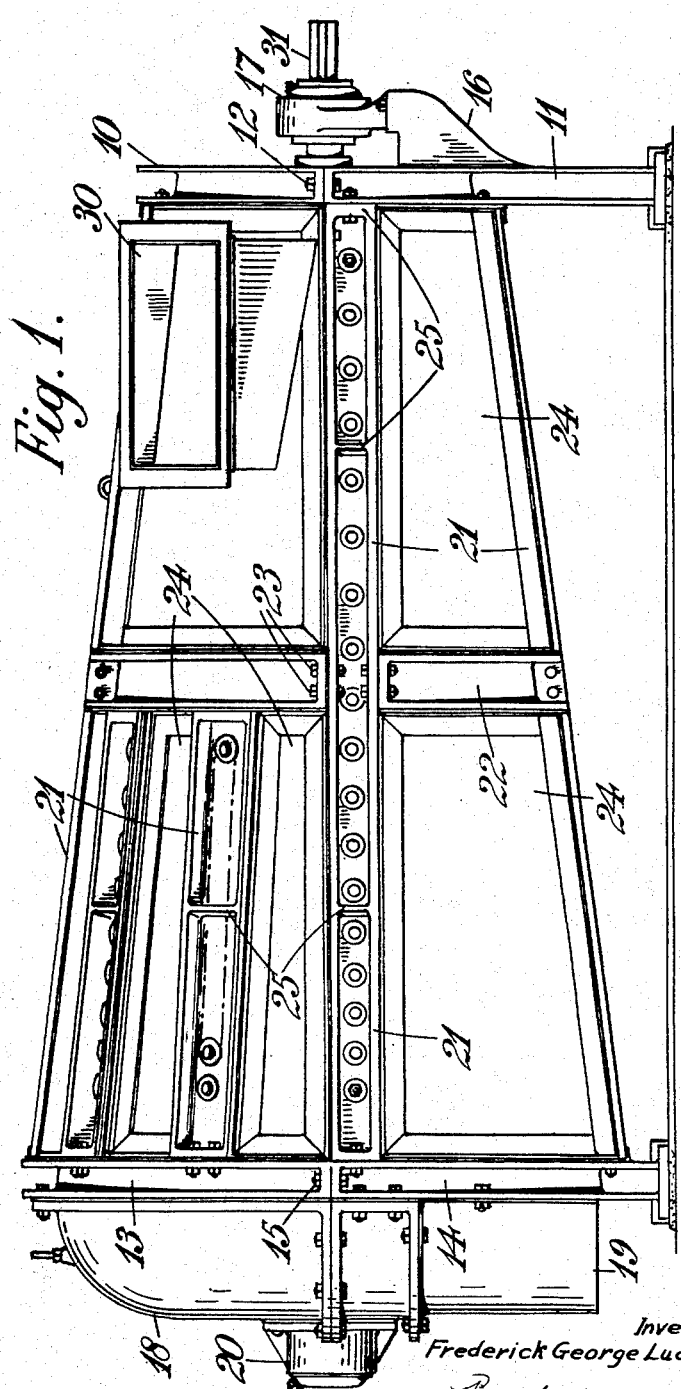
Figure 2:
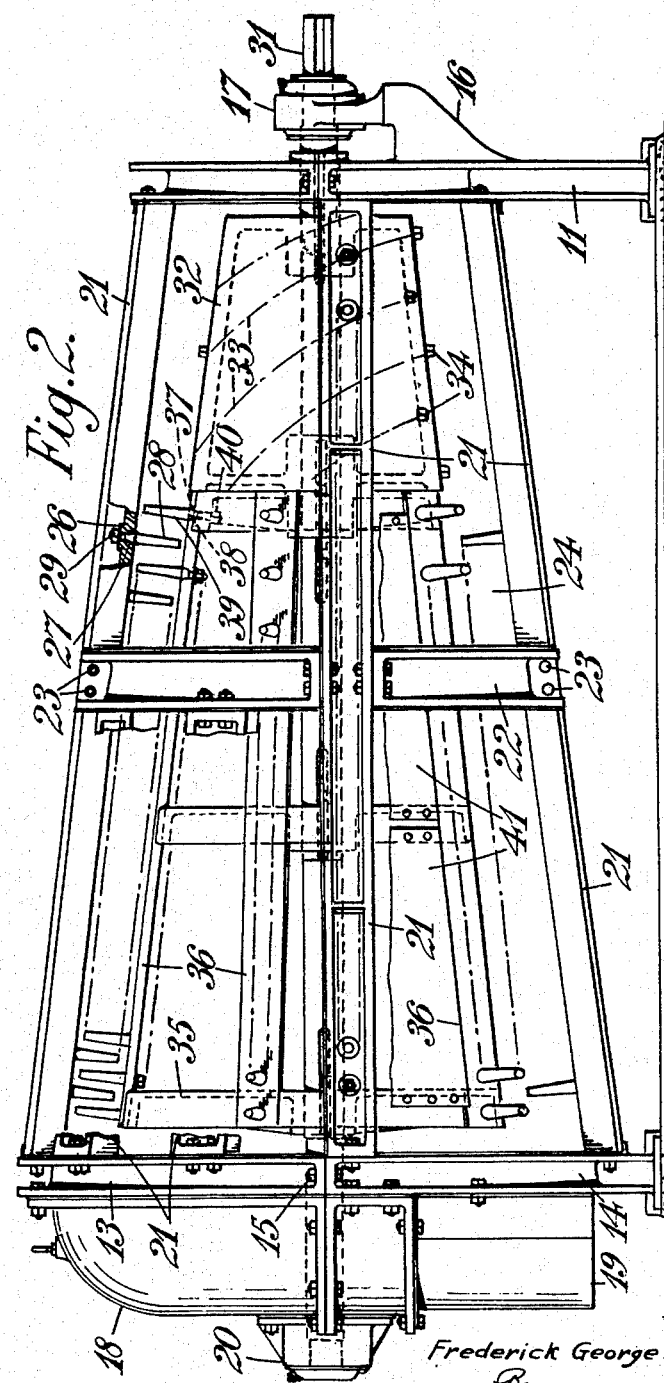
Figure 3:
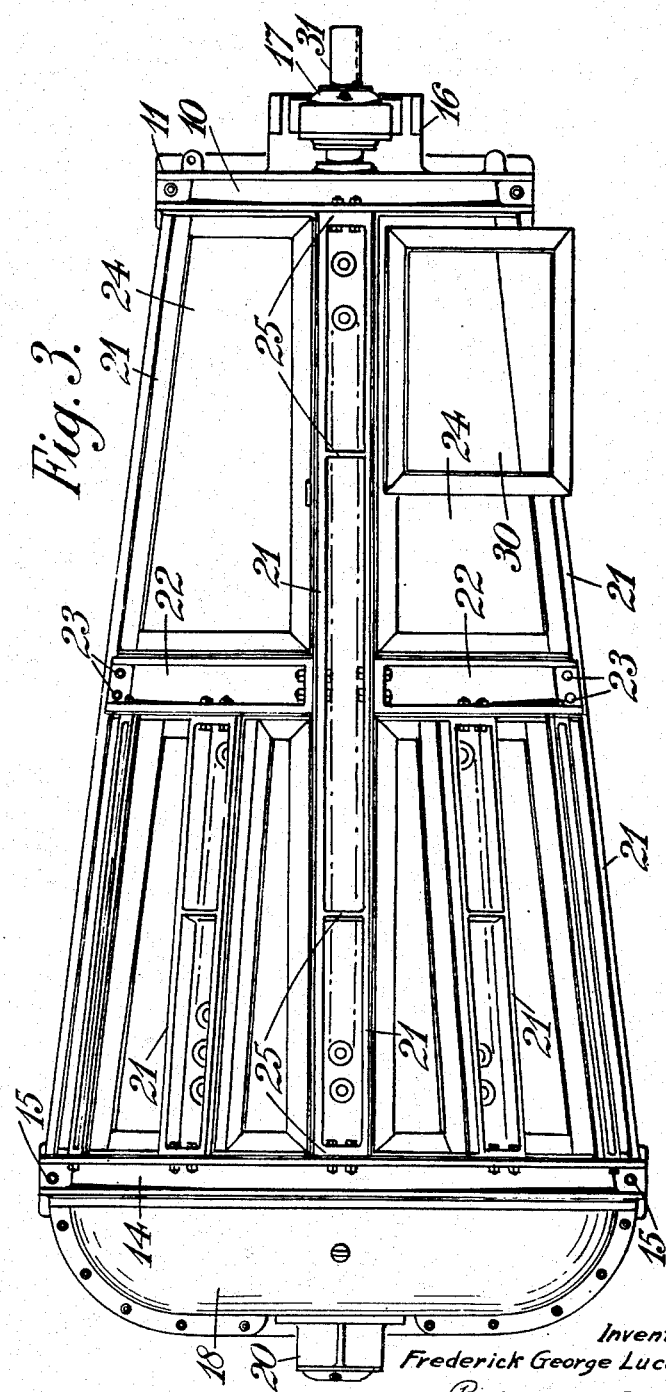
Figure 4:
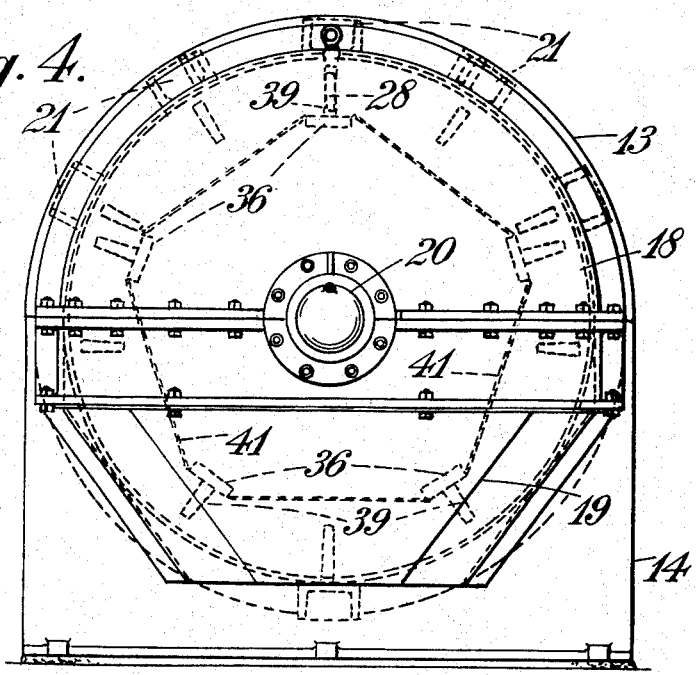
Figure 5:
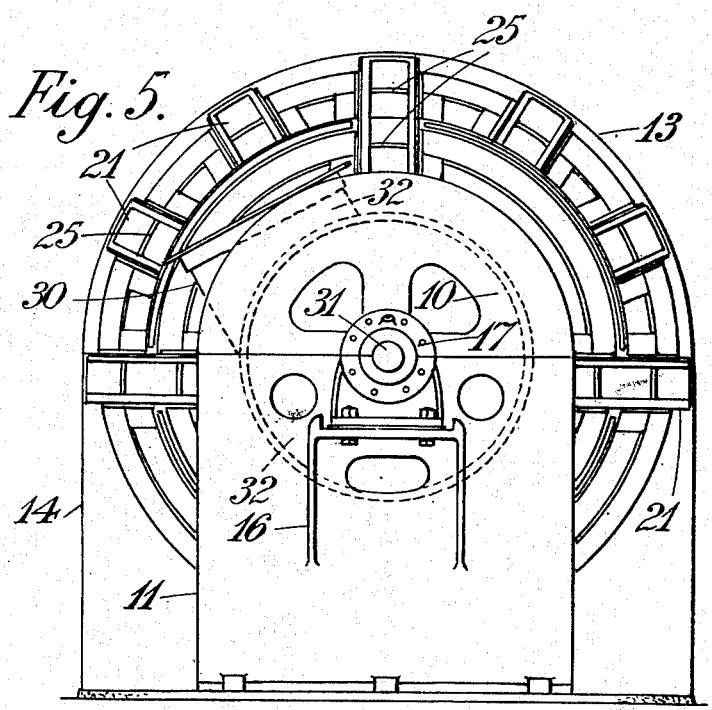

The following is a description of one form of apparatus according to this invention suitable for disintegrating bagasse willow reference being made to the accompanying drawing in which:

Figure 1 is a side elevation of the apparatus;
Figure 2 is a part vertical section and side elevation;
Figure 3 is a plan of the arrangement shown in Figure 1;
Figure 4 is an end elevation looking from the left of Figure 1, and
Figure 5 is an end elevation looking from the right of Figure 1.

The main frame of the apparatus comprise two arch shaped structures one larger than the other each formed in two parts, the smaller structure being formed in two cast parts 10 and 11 bolted together at 12 and the larger from two cast parts 13 and 14 bolted together at 15. The part 11 is formed with a bracket 16 for carrying a bearing 17 while the larger end structure with a two part downwardly directed chute 18, 19 has secured on the outer side thereof a bearing 20.

Extending between and secured to the end structures in an inclined manner are a number of beams 21 which are spaced apart intermediate of their ends by arcuate members 22 secured in position by bolts 23. The spaces between the beams end structures and arcuate members are closed by curved metal plates 24.

The beams which may be cast are channel shaped in cross-section and are provided with strengthening ribs 25 between their flanges while their web portions are formed with bosses 26 which are formed with taper holes for receiving the tapered ends 27 of inwardly directly tapered pegs or teeth 28 the pegs being held in place by nuts 29. It will be noted that the spacing apart of the pegs diminishes as the beams extend from the smaller to larger end structure.

One of the upper plates 24 near the smaller end structure is provided with a hopper 30 of rectangular configuration of such a size as to accommodate a bale of bagasse.

The bearings 17 and 20 carry a shaft 31 which is driven through a suitable transmission by a motor neither of which are shown and on which shaft is mounted a rotor. The rotor which is of a tapered character to correspond with the aforesaid inclined beams comprises at the smaller end opposite the hopper a hollow structure 32 of conical formation facets 33. Helical row of teeth 34 are detachably secured on the conical surface so that the spacing apart of these teeth along the helix may be so selected as to be comparable with the width of a bale whereby the bale may be readily forced between them whereby their disintegrating properties are enhanced.

A number of plates 35 of pentagonal contour are also secured to said shaft across which extend and are secured longitudinal members 36. These members are provided with tapered holes 37 for receiving the tapered shanks 38 of outwardly directed pegs 39 which are held in position by nuts 40. The spacing of these pegs along the longitudinal members are such as they pass centrally between the pegs 28 and thus their spacing diminishes towards the larger end structure. The spaces between the longitudinal members are closed flat plates 41. With this arrangement the portion ripped off the bale by the short teeth 34 are fed along the rotor and are rubbed between the tapered pegs thus freeing the fibres from pith and dust which passes together with the fibres out through the chute 18, 19 and are separated in a subsequent operation. The pegs 28 may be provided only on the upper beams 21 thus leaving a clear space under the rotor facilitating cleaning of the machine should blockage occur.

I claim:

1. An apparatus for disintegrating bales of bagasse and like fibrous materials comprising an outer casing, a rotor mounted in said casing for rotation therein, said casing having substantially rigid beams extending along the length thereof in inclined relationship to the axis of rotation, which beams are connected at their ends to frame members carrying bearings for the rotor, said beams being spaced apart by arcuate members intermediate the ends thereof, the spaces between the beams being closed by sheet metal plates forming with the beams a substantially continuous inner frusto-conical surface in the casing, a hopper at the small end of said conical surface in the casing, said hopper adapted to receive a bale and hold it against rotation with one face thereof directed toward the axis of rotation, a smooth inner surface on the portion of the casing containing the hopper, short teeth on the portion of the rotor beneath the hopper, said teeth being provided with ripping edges and spaced circumferentially apart a distance equal to the width of the face of the bale directed toward the axis of rotation, on spaced apart substantially helical paths, the tips of said teeth being spaced from the smooth inner surface of the casing to provide a gap between them and said surface, the rotor tapering along the length of the casing with the smaller end adjacent the hopper, said rotor being provided with outwardly extending blunt teeth spaced axially apart on spaced apart substantially axial paths by an amount which diminishes in the direction of travel of the material, and overlapping inwardly extending axially spaced blunt teeth on the casing, said overlapping blunt teeth being adapted to subject the ripped-off portions of the bales to a rubbing action and an outlet portion at the end of the casing remote from the hopper.

2. An apparatus for disintegrating bales of bagasse and like fibrous materials comprising an outer casing, a rotor mounted in said casing for rotation therein, said casing having substantially rigid beams extending along the length thereof in inclined relationship to the axis of rotation, which beams are connected at their ends to frame members carrying bearings for the rotor, said beams being spaced apart by arcuate members intermediate the ends thereof, the spaces between the beams being closed by sheet metal plates forming with the beams a substantially continuous frusto-conical surface in the casing, a hopper at the small end of said conical surface in the casing, said hopper adapted to receive a bale and hold it against rotation with one face thereof directed toward the axis of rotation, a smooth inner surface on the portion of the casing containing the hopper, a frusto-conical portion on the rotor beneath the hopper, short teeth on said frusto-conical rotor portion, said teeth being provided with ripping edges and spaced circumferentially apart a distance equal to the width of the face of the bale directed toward the axis of rotation on spaced-apart helical paths, the tips of said teeth being spaced from the smooth inner surface of the casing to provide a gap between them and said surface, a tapered polygonal portion on the balance of said rotor tapering along the length of the casing with the smaller end adjacent the large end of the frusto-conical rotor portion, said casing and polygonal rotor portion being provided with inwardly and outwardly extending blunt teeth which overlap and are spaced apart axially by an amount which diminishes in the direction of travel of the materials and which are adapted to subject the ripped-off portions of the bales to a rubbing action and an outlet portion at the end of the casing remote from the hopper.

References Cited in the file of this patent

UNITED STATES PATENTS

| Number | Name | Date |
|---|---|---|
| A. I. 187 | Mackerley | Jan. 19, 1858 |
| 21,421 | Hoyer | Sept. 7, 1858 |
| 107,480 | Glas | Sept. 20, 1870 |
| 252,128 | Morts | Jan. 10, 1882 |
| 297,763 | Case | Apr. 29, 1884 |
| 366,700 | Stevens | July 19, 1887 |
| 407,751 | Walters et al. | July 23, 1889 |
| 454,094 | Vigreux | June 16, 1891 |
| 670,643 | Sargent | Mar. 26, 1901 |
| 730,617 | Dietrich | June 9, 1903 |
| 1,058,997 | Nash | Apr. 15, 1913 |
| 1,698,838 | Bryant | Jan. 15, 1929 |
| 1,977,955 | Robinson | Oct. 23, 1934 |
| 2,283,402 | Welty | May 19, 1942 |

FOREIGN PATENTS

| Number | Country | Date |
|---|---|---|
| 260,750 | Germany | June 12, 1913 |